(12) United States Patent
Perkins et al.

(10) Patent No.: US 10,926,860 B2
(45) Date of Patent: Feb. 23, 2021

(54) DECOMPRESSION PANEL ASSEMBLY AND METHODS OF ASSEMBLING THE SAME

(71) Applicant: The Boeing Company, Chicago, IL (US)

(72) Inventors: Thomas Seth Perkins, Renton, WA (US); Adam R. Weston, Brier, WA (US)

(73) Assignee: The Boeing Company, Chicago, IL (US)

( * ) Notice: Subject to any disclaimer, the term of this patent is extended or adjusted under 35 U.S.C. 154(b) by 324 days.

(21) Appl. No.: 16/225,208

(22) Filed: Dec. 19, 2018

(65) Prior Publication Data

US 2020/0198759 A1 Jun. 25, 2020

(51) Int. Cl.
*B64C 1/18* (2006.01)
*B64C 1/06* (2006.01)
*B64C 1/00* (2006.01)

(52) U.S. Cl.
CPC ............... *B64C 1/18* (2013.01); *B64C 1/069* (2013.01); *B64C 2001/009* (2013.01)

(58) Field of Classification Search
CPC ...... B64C 1/18; B64C 1/069; B64C 2001/009
See application file for complete search history.

(56) References Cited

U.S. PATENT DOCUMENTS

| 8,955,803 | B2 | 2/2015 | Voss et al. | |
|---|---|---|---|---|
| 9,440,744 | B2 | 9/2016 | Perkins et al. | |
| 9,751,609 | B2 | 9/2017 | Perkins et al. | |
| 2011/0139931 | A1* | 6/2011 | Opp | B64C 1/18 244/121 |
| 2015/0108274 | A1* | 4/2015 | Perkins | B64C 1/18 244/129.4 |
| 2015/0117945 | A1 | 4/2015 | Perkins et al. | |
| 2015/0225068 | A1* | 8/2015 | Boyer | B64C 1/18 244/118.1 |
| 2017/0349261 | A1 | 12/2017 | Brown et al. | |

FOREIGN PATENT DOCUMENTS

WO 2015057269 A1 4/2015

OTHER PUBLICATIONS

Examination Report regarding European Union Design application serial No. 006584595 dated Aug. 12, 2109, pp. 1-5.
Extended Search Report regarding European Patent Application No. 19180444.2 dated Nov. 28, 2019; pp. 1-7.

* cited by examiner

*Primary Examiner* — Rodney A Bonnette
(74) *Attorney, Agent, or Firm* — Armstrong Teasdale LLP (57) ABSTRACT

A decompression panel assembly for use in an aircraft includes a body panel having an opening defined therein and a cover panel positioned within the opening and spaced from the body panel. The decompression panel assembly also includes an annular spacer panel positioned outboard from the cover panel and the body panel. The spacer panel is spaced from the cover panel to define a first annular flow path between the cover panel and the spacer panel, and the spacer panel is spaced from the body panel to define a second annular flow path between the body panel and the spacer panel.

35 Claims, 10 Drawing Sheets

DECOMPRESSION PANEL ASSEMBLY AND METHODS OF ASSEMBLING THE SAME

BACKGROUND

The field of the present disclosure relates generally to aircraft sidewall panel assemblies and, more specifically, to decompression panel assemblies for use in aircraft assemblies.

During a pressure change on an aircraft (such as a decompression event), air may flow from a passenger cabin to a cargo bay below the cabin through a cabin sidewall. Accordingly, the cabin sidewalls include decompression panels or decompression grills that restrict such airflow in standard operation and enable the airflow during a decompression event. Known decompression panels are solid panels and move to create an opening in the sidewall. At least some known decompression panels swing into the space between the sidewall and fuselage skin during a decompression event. However, at least some such known decompression panels are heavier than alternatives and include an electronically connected or pressure sensitive mechanical latch systems and also require a relatively large volume between the passenger cabin and the skin of the aircraft to deploy.

At least some alternative known decompression grilles include an opening having louvers or have several openings through the grille. These openings allow air to flow through the grille during a decompression event so the grille does not move during the decompression event. A sound attenuating material (a.k.a., a baffle) is coupled to the backside of the grille opening(s) to decrease the noise in the cabin and can release from the grille during a decompression event. However, in at least some known configurations, the baffle is only connected to the grille at discrete points, which may cause the baffle to resonate and transfer noise to the cabin. Furthermore, such louvered configurations provide for a larger dust accumulation surface, and have a greater potential for passenger abuse, trash trap, and noise transmission than desired.

BRIEF DESCRIPTION

In one aspect, a decompression panel assembly for use in an aircraft is provided. The decompression panel assembly includes a body panel having an opening defined therein and a cover panel positioned within the opening and spaced from the body panel. The decompression panel assembly also includes an annular spacer panel positioned outboard from the cover panel and the body panel. The spacer panel is spaced from the cover panel to define a first annular flow path between the cover panel and the spacer panel, and the spacer panel is spaced from the body panel to define a second annular flow path between the body panel and the spacer panel.

In another aspect, a decompression panel assembly for use in an aircraft is provided. The decompression panel assembly includes a first annular baffle element coupled to a first panel and a second panel such that the first baffle element forms a seal between the first panel and the second panel. The decompression panel assembly also includes a second annular baffle element coupled to the second panel and a third panel such that the second baffle element forms a seal between the second panel and the third panel.

In another aspect, a method of assembling a decompression panel assembly in an aircraft is provided. The method includes positioning a cover panel within an opening defined in a body panel such that an annular gap is defined between the body panel and the cover panel. The method also includes positioning an annular spacer panel outboard from the cover panel and the body panel such that the spacer panel spans the annular gap. The spacer panel is further positioned such that the spacer panel spaced from the cover panel to define a first flow path between the cover panel and the spacer panel and to define a second flow path between the body panel and the spacer panel.

In yet another aspect, a method of providing a decompression flow path in an aircraft is provided. The method includes defining a first annular flow path between a cover panel and spacer panel and defining a second annular flow path between the spacer panel and a body panel, wherein the second flow path circumscribes the first flow path. The method also includes preventing airflow through the first annular flow path with a first baffle element during a first operating condition and channeling airflow through the first annular flow path in a second operating condition.

DETAILED DESCRIPTION

The embodiments illustrated herein describe a decompression panel assembly having a cover panel positioned in an opening in a body panel to define a gap around the cover panel. An annular spacer panel is positioned outboard from the cover panel and the body panel to define a first annular flow path between the cover panel and the spacer panel and a second annular flow path between the body panel and the spacer panel. As described herein, the body, cover, and spacer panels are designed to closely match each other in texture and color and to match the rest of the cabin interior to improve the visual characteristics of the aircraft sidewall assembly.

The decompression panel assembly also includes a first louver member coupled within the first flow path and a second louver member coupled within the second flow path. The louver members are positioned behind the cover panel and body panel, respectively, and out of view from within the aircraft cabin. Positioning the louver members in such a configuration reduces accessibility to passengers and thus minimizes the potential for passenger abuse. Additionally, the louver members are hidden from view to prevent passengers from seeing any potential unsightly buildup of dust on the louver members.

The decompression panel assembly also includes a first baffle element is coupled to the cover panel and spacer panel to selectively seal the first flow path, and a second baffle element is coupled to the body panel and the spacer panel to selectively seal the second flow path. The baffle elements are continuously attached to their respective panels about their entire circumference to form an air-tight seal. During standard operations, the seals prevent airflow along either of the flow paths to reduce or prevent noise generated by vibrations caused by airflow leakage. Additionally, the baffle elements use an adhesive to bond to the panels rather than a releasable mechanical fastener, which reduces the weight and costs of the decompression panel assembly.

Figure 1:
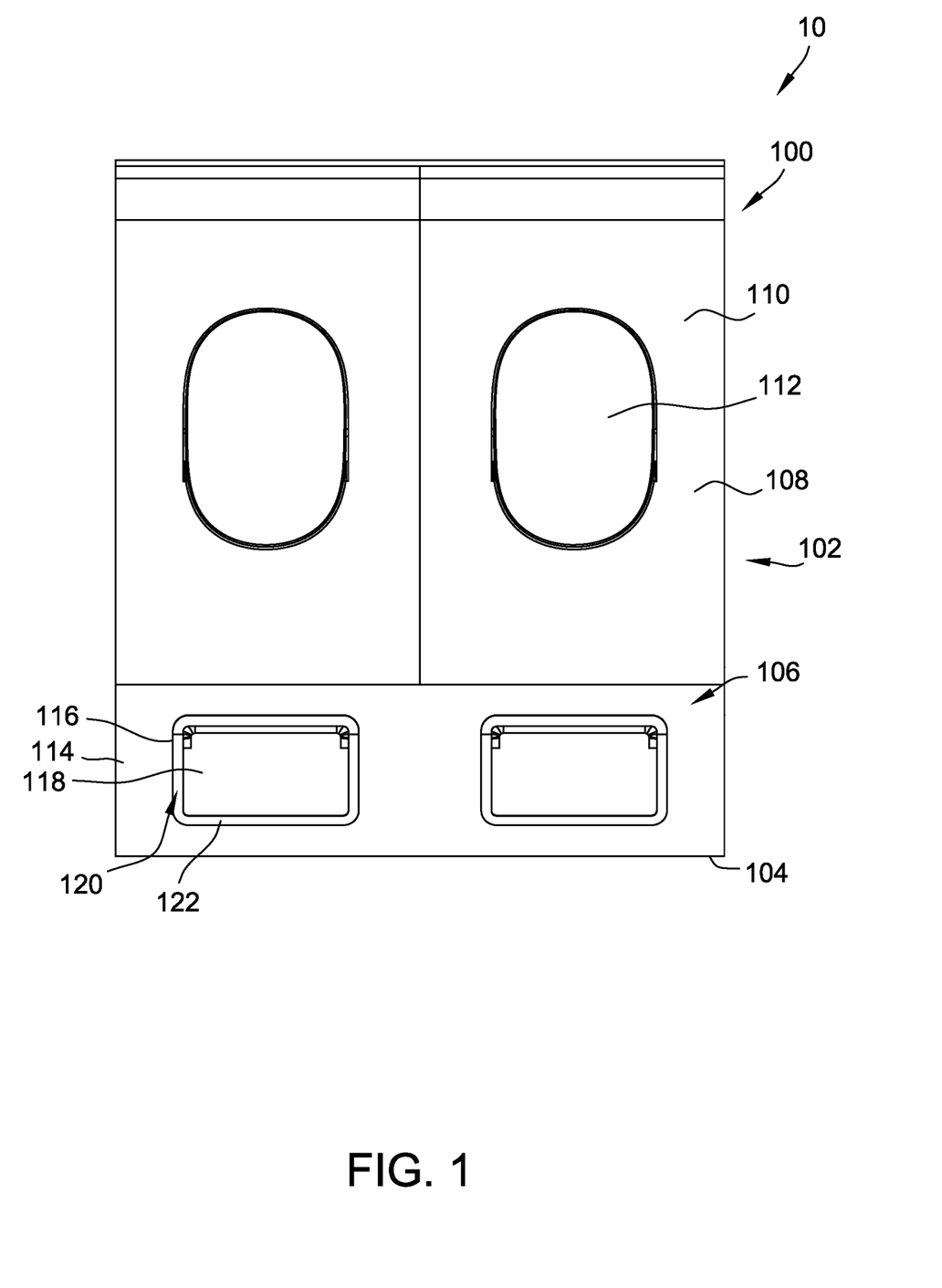
FIG. 1 is a front view of an inboard configuration of an exemplary aircraft cabin including an exemplary decompression panel assembly.
Figure 2:
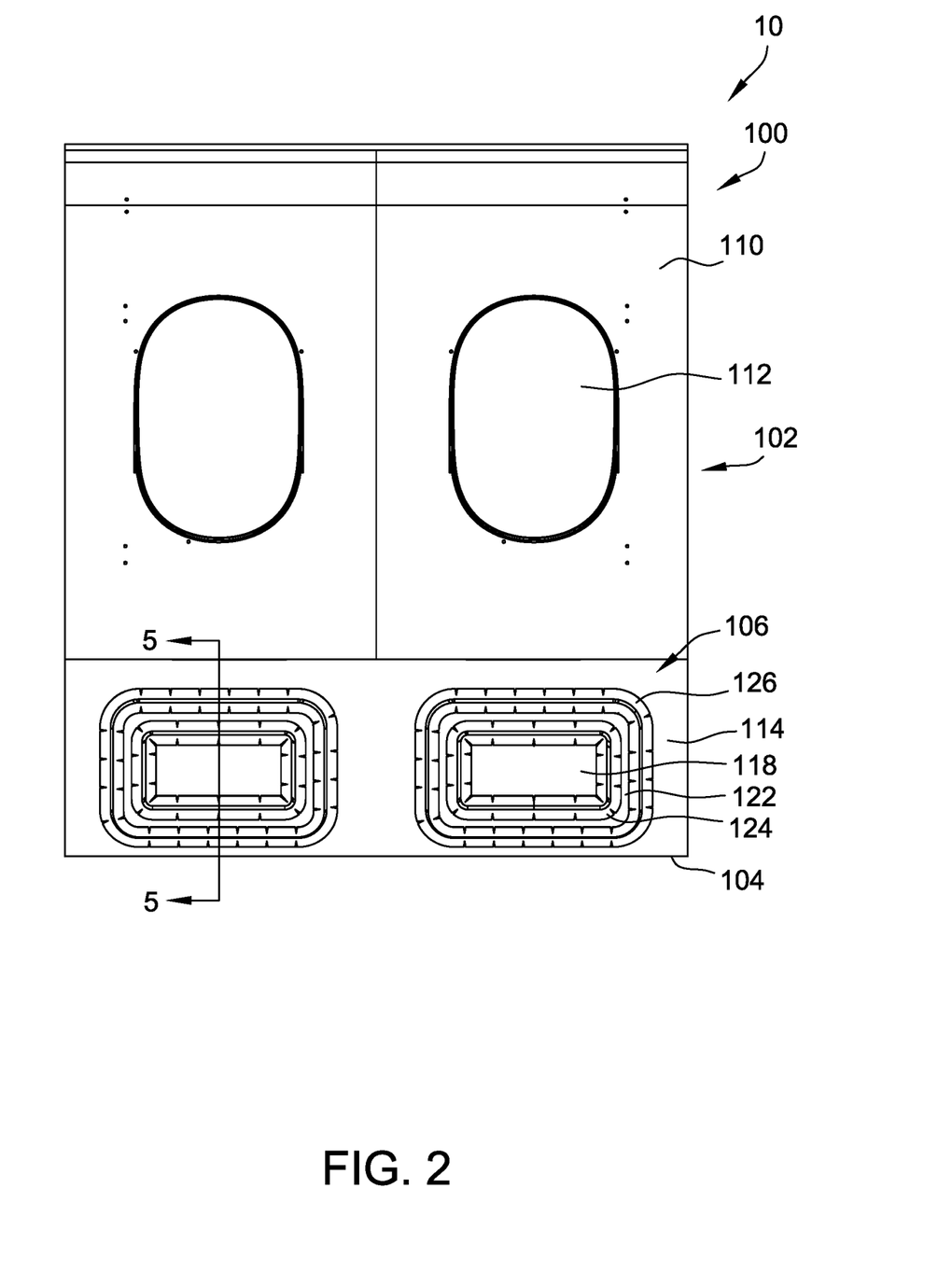
FIG. 2 is a rear view of an outboard configuration of the aircraft cabin including the decompression panel assembly shown in FIG. 1.

Referring to the drawings, FIG. 1 is a front view of an inboard configuration of an exemplary cabin 100 that may be used with an aircraft 10. FIG. 2 is a rear view of an outboard configuration of the aircraft cabin including the decompression panel assembly shown in FIG. 1. In the exemplary implementation, cabin 100 includes a sidewall assembly 102, a floor panel 104, and a decompression panel assembly 106 coupled therebetween. Sidewall assembly 102, floor panel 104, and decompression panel assembly 106 at least partially define an interior 108 of cabin 100. Sidewall assembly 102 includes a sidewall 110 having a window opening 112 defined therein. Alternatively, sidewall 110 does not include window opening 112. In operation, decompression panel assembly 106 facilitates equalizing the pressure in cabin 100 during a decompression event.

In the exemplary implementation, decompression panel assembly 106 includes a body panel 114 having an opening 116 defined therein. A cover panel 118 is positioned within opening 116 and spaced from body panel 114 such that an annular gap 120 is defined between cover panel 118 and body panel 114 about a perimeter of cover panel 118. Decompression panel assembly 106 also includes an annular spacer panel 122 positioned outboard from cover panel 118 and body panel 114. Specifically, as described in further detail herein, annular spacer panel 122 is annular in shape and spans annular gap 120 such that annular spacer panel 122 partially overlaps both cover panel 118 and body panel 114. As shown in FIG. 1, cover panel 118 and annular spacer panel 122 are visible from cabin 100 and so are designed to blend in with body panel 114. More specifically, cover panel 118, annular spacer panel 122, and body panel 114 are formed from a substantially similar material and are substantially the same color so as to appear as a single solid panel from within cabin 100.

FIG. 2 shows an outboard side of decompression panel assembly 106 and illustrates a first baffle element 124 coupled to cover panel 118 and to spacer panel 122. Additionally, a second baffle element 126 is coupled to spacer panel 122 and to body panel 114. As shown in FIG. 2, first baffle element 124 and second baffle element 126 are annular in shape and are concentric such that second baffle element 126 circumscribes first baffle element 124.

Figure 3:
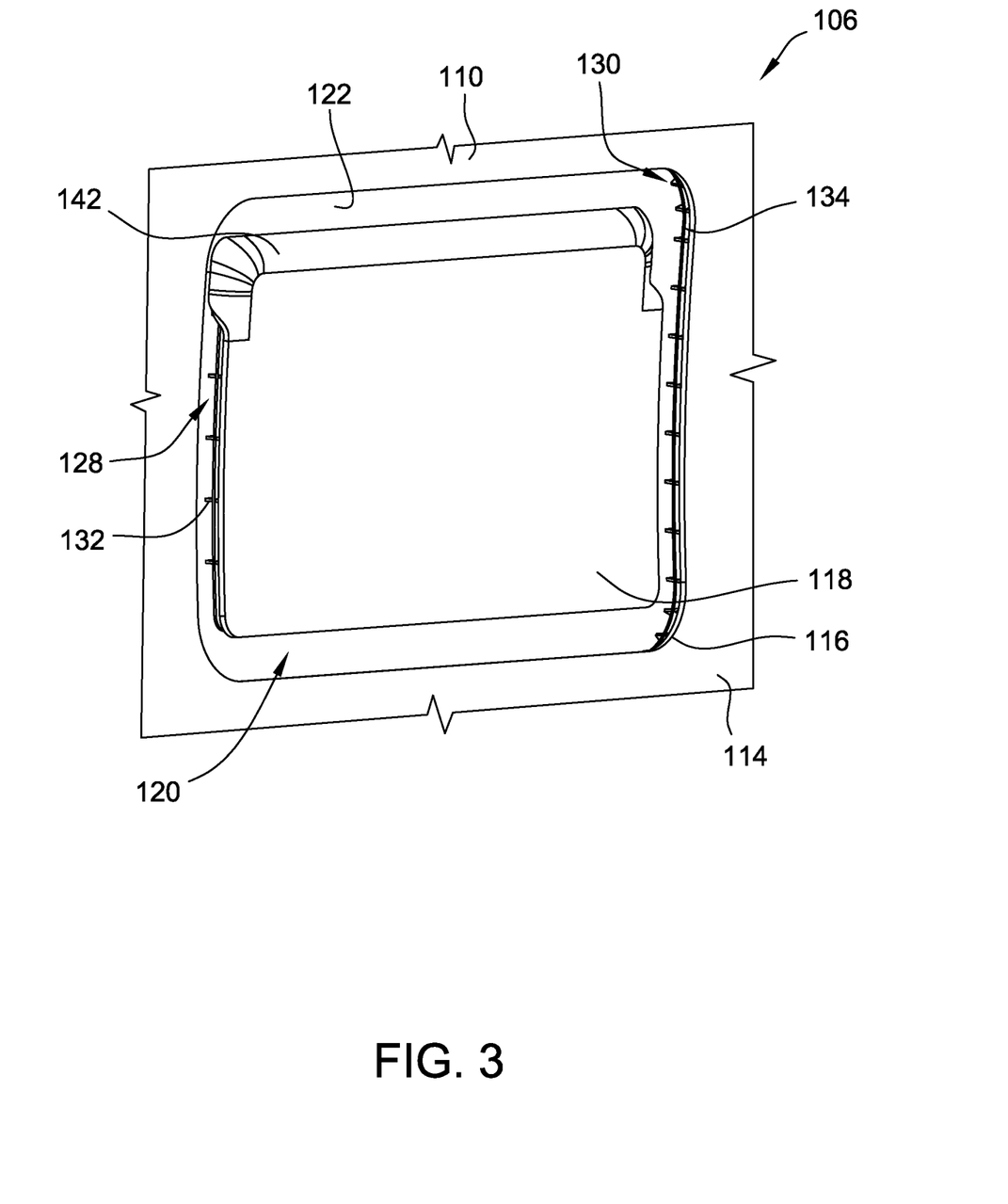
FIG. 3 is a perspective inboard view of the decompression panel assembly shown in FIG. 1.
Figure 4:
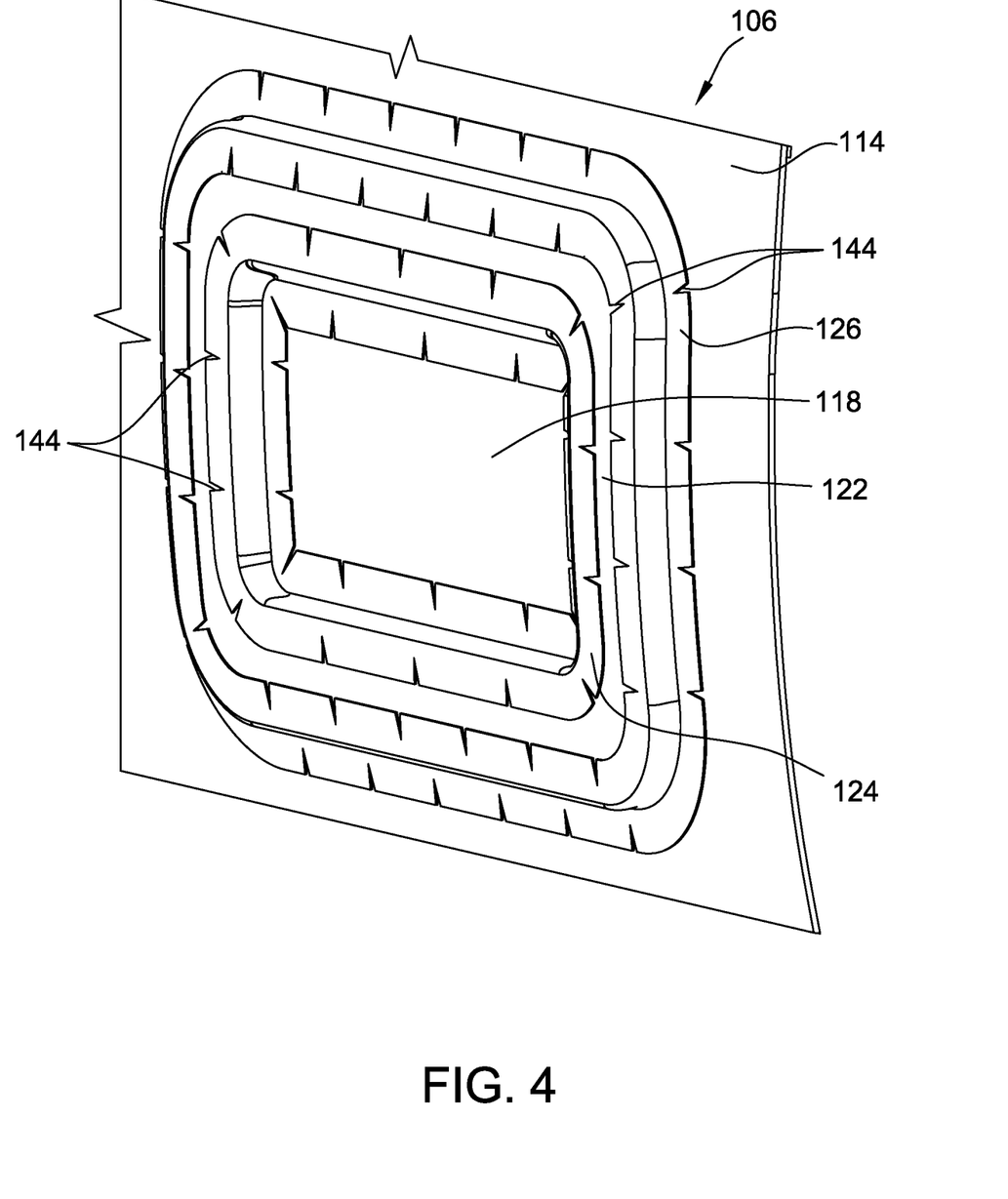
FIG. 4 is a perspective outboard view of the decompression panel assembly shown in FIG. 1.
Figure 5:
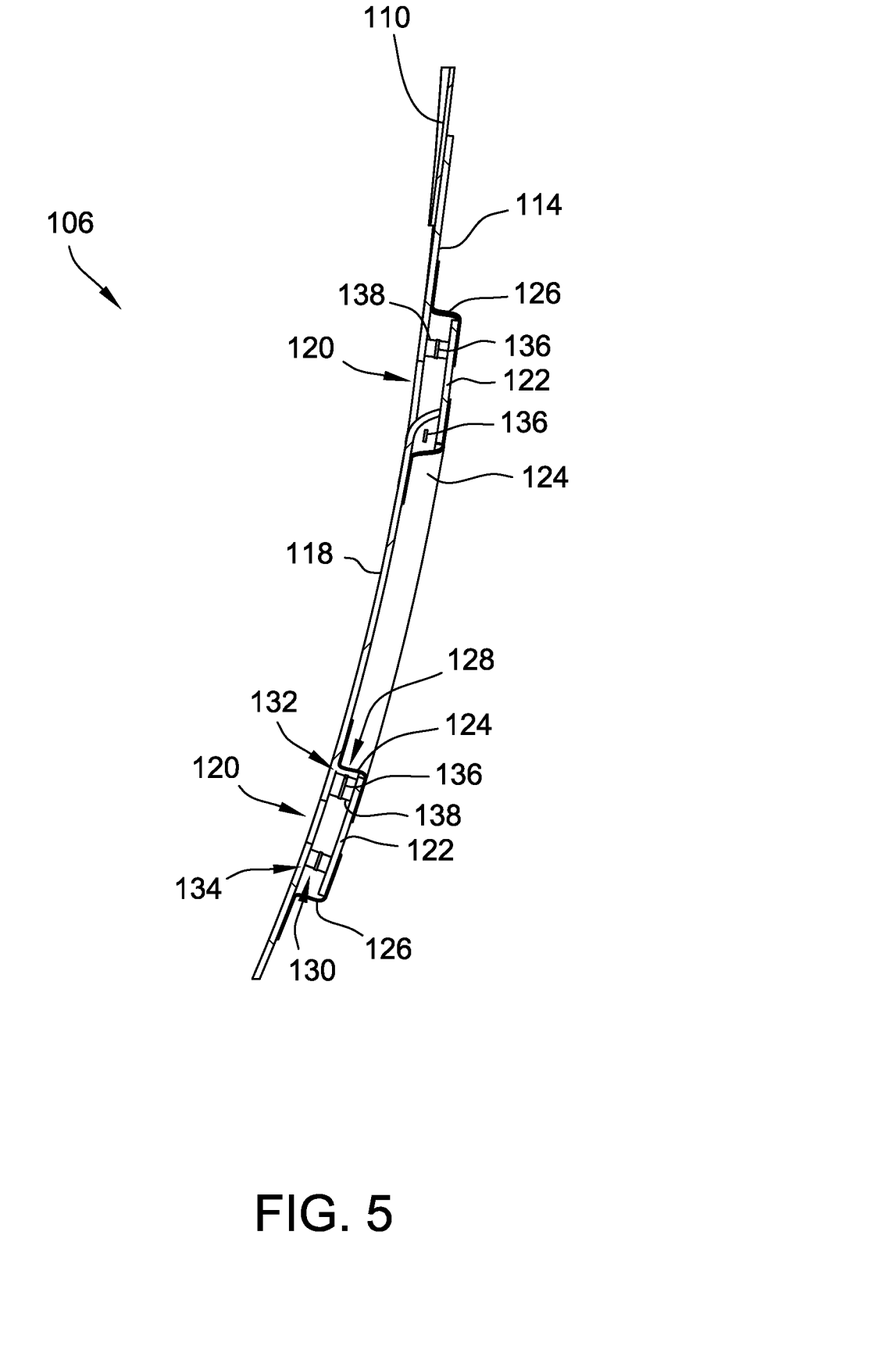
FIG. 5 is a side cross-sectional view of the decompression panel assembly shown in FIG. 1.
Figure 6:
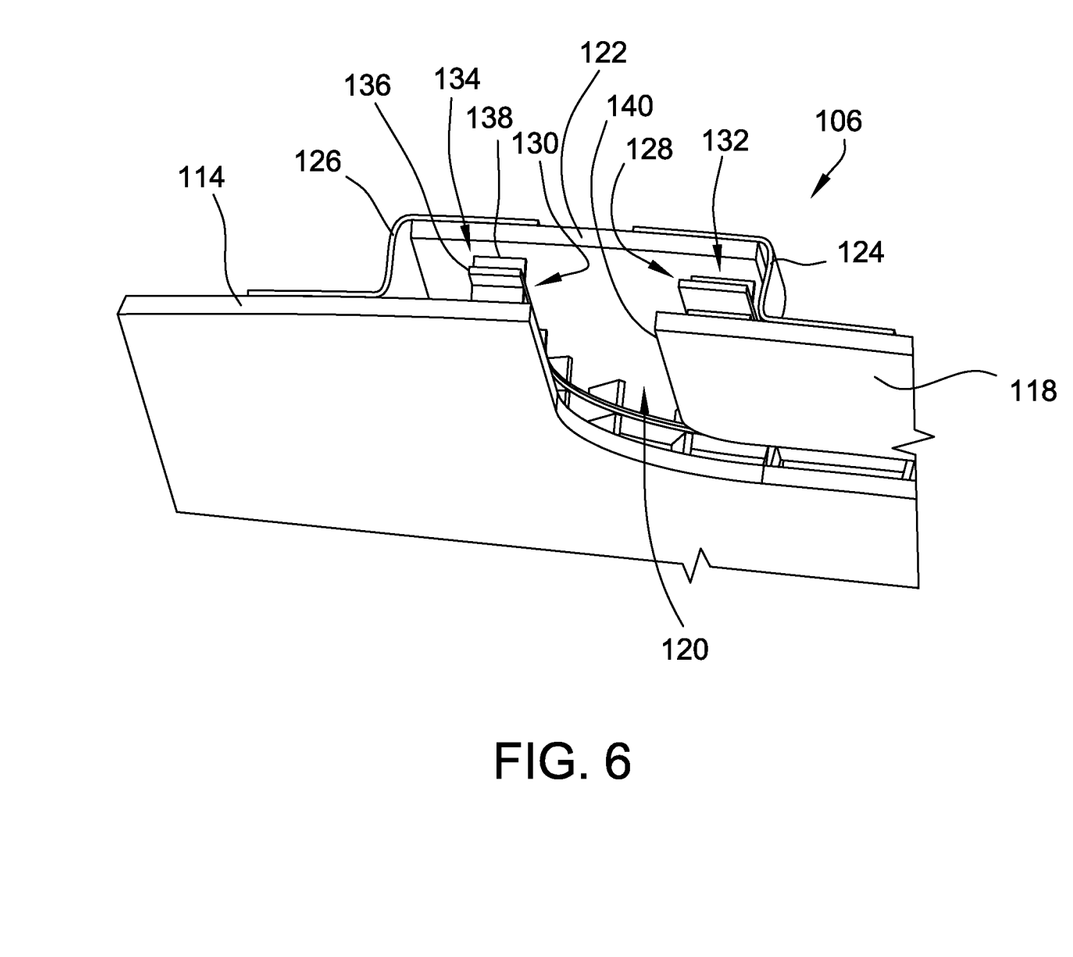
FIG. 6 is a perspective cross-sectional view of the decompression panel assembly shown in FIG. 1 at a first location.
Figure 7:
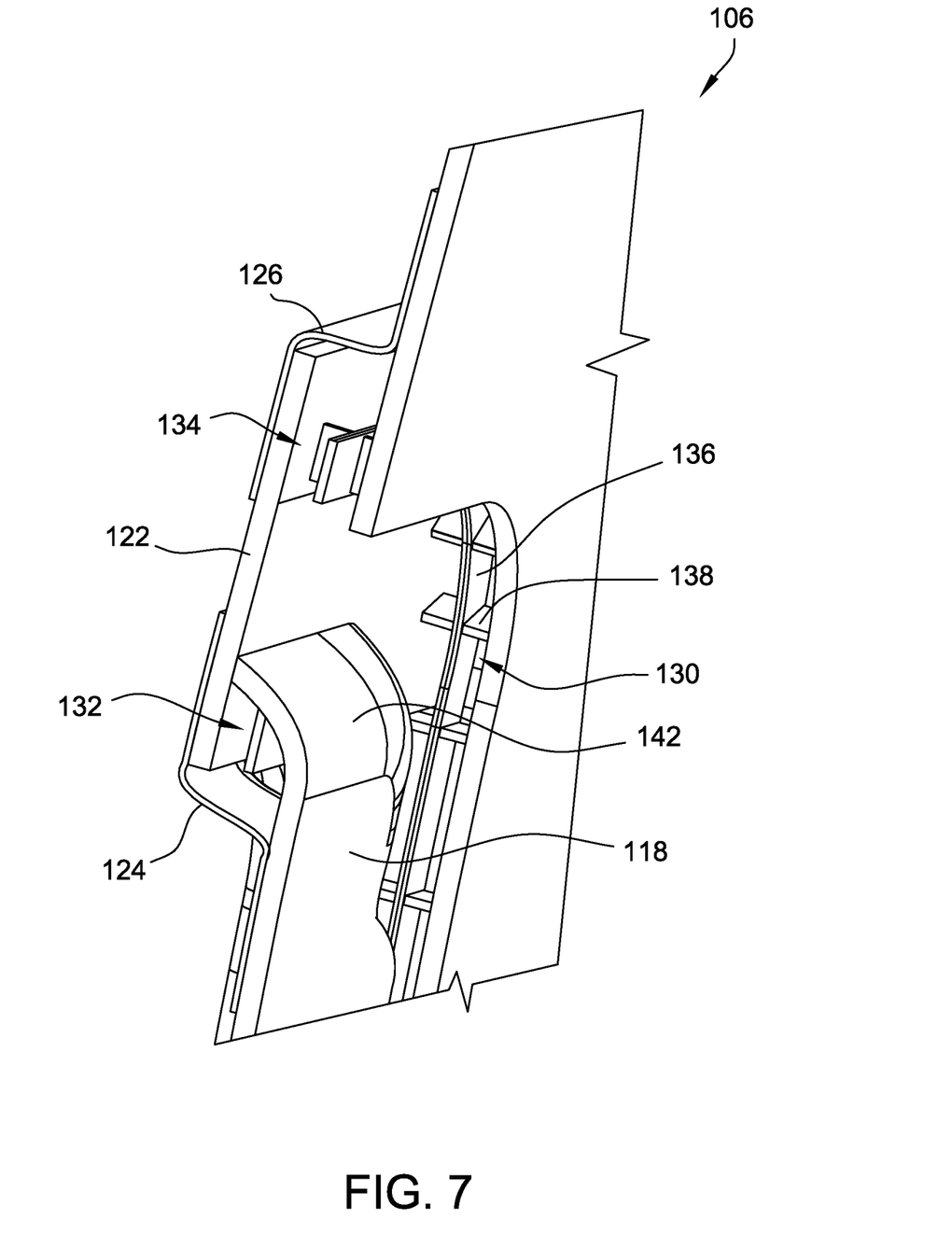
FIG. 7 is a perspective cross-sectional view of the decompression panel assembly shown in FIG. 1 at a second location.
Figure 8:
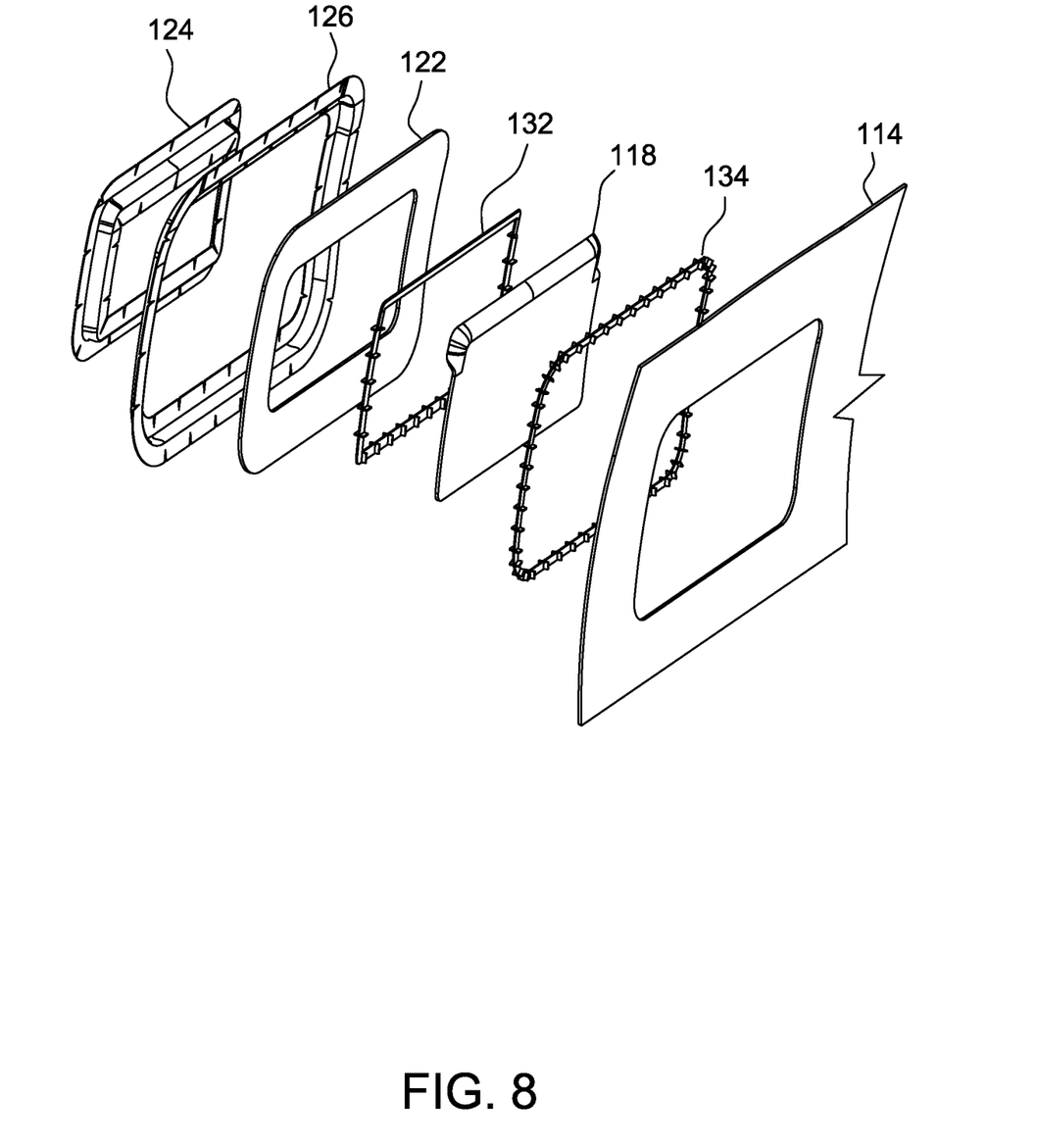
FIG. 8 is an exploded view of the decompression panel assembly shown in FIG. 1.

FIG. 3 is a perspective inboard view of decompression panel assembly 106. FIG. 4 is a perspective outboard view of decompression panel assembly 106. FIG. 5 is a side cross-sectional view of decompression panel assembly 106 taken along line 5-5 shown in FIG. 2. FIG. 6 is a perspective cross-sectional view of decompression panel assembly 106 at a first location. FIG. 7 is a perspective cross-sectional view of decompression panel assembly 106 at a second location. FIG. 8 is an exploded view of decompression panel assembly 106.

In the exemplary embodiment, spacer panel 122 is spaced from cover panel 118 to define a first annular flow path 128 between cover panel 118 and spacer panel 122. Further, spacer panel 122 is spaced from body panel 114 to define a second annular flow path 130 between body panel 114 and spacer panel 122. As described herein, second flow path 130 circumscribes first flow path 128 and the two flow paths are designed to combine to channel a high volume of air therethrough during a decompression event while each remains relatively small in size to occupy a minimal amount of space. As best shown in FIGS. 5 and 6, decompression panel assembly 106 includes a first louver member 132 coupled between cover panel 118 and spacer panel 122 and positioned within first flow path 128. Moreover, decompression panel assembly 106 also includes a second louver member 134 coupled between cover panel 118 and spacer panel 122 and positioned within first flow path 128. Louver members 132 and 134 each include a ring-shaped element 136 positioned between spacer panel 122 and body panel 114 in the case of second louver member 134, and between cover panel 118 and spacer panel 122, in the case of first louver member 132. Additionally, each louver member 132 and 134 includes support members 138 that are coupled to and extend between spacer panel 122 and body panel 114 in the case of second louver member 134, and between cover panel 118 and spacer panel 122 in the case of first louver member 132. As such, louver member 132 and 134 couple spacer panel 122 to cover panel 118 and body panel 114 and facilitate guiding airflow through flow paths 128 and 130.

In the exemplary implementation, louver members 132 and 134 are annular in shape such that second louver member 134 is concentric with and circumscribes first louver member 132. As best shown in FIG. 6, first louver member 132 couples cover panel 118 to spacer panel 122 and is positioned inside of an outer perimeter 140 of cover panel 118 such that first louver member 132 is hidden from view from inside cabin 100. Similarly, second louver member 134 couples body panel 114 to spacer panel 122 and is positioned about a circumference of opening 116 of body panel 114 such that second louver member 134 is also hidden from view from inside cabin 100. In some implementations, the surfaces of support members 138 of louver members 132 and 134 may accumulate dust and so positioning them behind cover panel 118 and body panel 114 removes them from view of a passenger to improve aesthetics and also reduces the potential for passenger abuse.

As best shown in FIGS. 3 and 7, cover panel 118 includes a curved top portion 142 that curves towards spacer panel 122. In the exemplary implementation, curved top portion 142 contacts spacer panel 122 to restrict a portion of first flow path 128. In another implementation, curved top portion 142 extends close to, but does not contact, spacer panel 122. Specifically, curved top portion 142 restricts a portion of first flow path 128 to reduce debris accumulation on first louver member 132. Curved top portion 142 causes any debris placed there by a passenger to slide back into interior 108 of cabin 100 rather than becoming lodged in first louver member 132.

Referring now to FIGS. 4, 6, and 7, first baffle element 124 is coupled to cover panel 118 and to spacer panel 122 and is annular in shape such that first baffle element 124 forms a seal between cover panel 118 and to spacer panel 122 to selectively seal first flow path 128 in a first operating condition of aircraft 10. Similarly, second baffle element 126 is coupled to body panel 114 and to spacer panel 122 and is annular in shape such that second baffle element 126 forms a seal between body panel 114 and to spacer panel 122 to selectively seal second flow path 130 in a first operating condition of aircraft 10. Specifically, in one implementation, baffle elements 124 and 126 are coupled to corresponding panels 118, 122, and 114 using a pressure sensitive adhesive that forms an air-tight seal across first flow path 128 and second flow path 130. In the exemplary implementation, baffle elements 124 and 126 both include a plurality of designated fracture zones 144 that form lines of weakness configured to tear during a decompression event to enable airflow through first flow path 128 between cover panel 118 and spacer panel 122 and through second flow path 130 between body panel 114 and spacer panel 122.

During a first operating condition of aircraft 10, that is, during standard operation, air can enter annular gap 120 between body panel 114 and cover panel 118 but is prevented from continuing along first flow path 128 between cover panel 118 and spacer panel 122 by first baffle element 124 and is prevented from continuing along second flow path 130 between body panel 114 and spacer panel 122 by second baffle element 126. Specifically, first baffle element 124 is coupled to cover panel 118 and spacer panel 122 about an entire circumference of first flow path 128 to prevent airflow through first flow path 128 during standard operating conditions. Similarly, second baffle element 126 is coupled to body panel 114 and spacer panel 122 about an entire circumference of second flow path 130 to prevent airflow through second flow path 130 during standard operating conditions. In the exemplary embodiment, baffle elements 124 and 126 are coupled to corresponding panels 118, 122, and 114 using an adhesive that forms an air-tight seal along first and second flow paths 128 and 130. In another embodiment, baffle elements 124 and 126 are coupled to corresponding panels 118, 122, and 114 using any means that results in an air-tight seal along first and second flow paths 128 and 130. The air-tight seal results in reduced or eliminated noise transmission.

During a second operating condition, such as during a decompression event, a pressure differential between cabin interior 108 and an environment outside of interior 108 causes first baffle element 124 and second baffle element 126 to tear or fragment along pre-formed designated fracture zones 144 to enable channeling of an airflow through the first flow path 128 and the second flow path 130. The amount of designated fracture zones 144 is sufficient to cause first baffle element 124 and second baffle element 126 to tear into small enough pieces so as to not block first flow path 128 and the second flow path 130.

Figure 9:
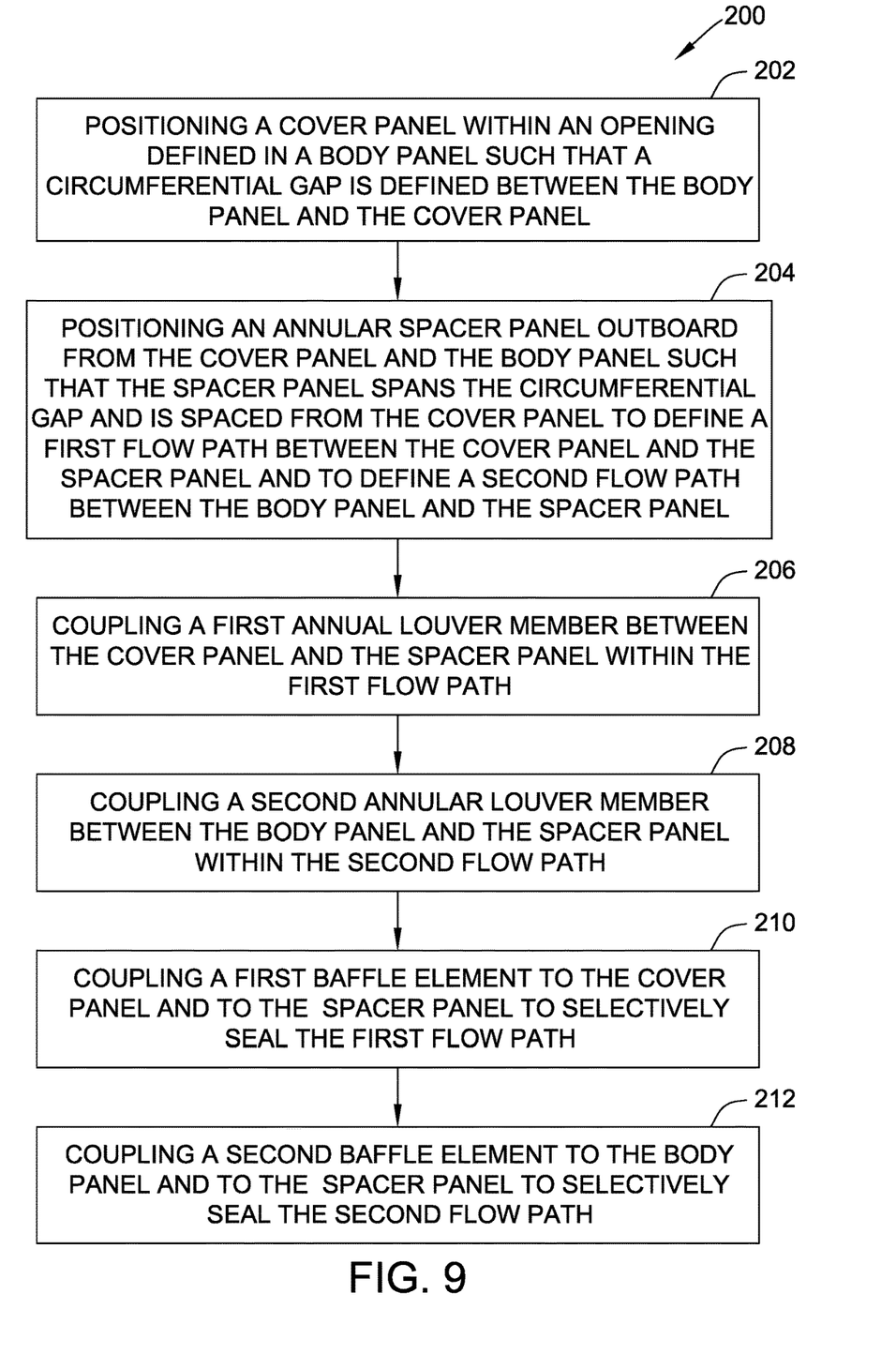
FIG. 9 is a flow chart of a method of assembling the decompression panel assembly shown in FIG. 1.

FIG. 9 is a flow chart of a method 200 of assembling decompression panel assembly 106 in aircraft 10. Method 200 includes positioning 202 cover panel 118 within opening 116 defined in body panel 114 such that annular gap 120 is defined between body panel 114 and cover panel 118. Furthermore, method 200 includes positioning 204 annular spacer panel 122 outboard from cover panel 118 and body panel 114 such that annular spacer panel 122 spans annular gap 120 and such that spacer panel 122 is spaced from cover panel 118 to define first flow path 128 between cover panel 118 and spacer panel 122 and to define second flow path 130 between body panel 114 and spacer panel 122. Method 200 also includes coupling 206 first annular louver member 132 between cover panel 118 and spacer panel 122 within first flow path 128 and coupling 208 second annular louver member 134 between body panel 114 and spacer panel 122 within second flow path 130. Coupling 208 second annular louver member 134 includes coupling second louver member 134 such that second annular louver member 134 circumscribes first annular louver member 132. Method 200 also includes coupling 210 first baffle element 124 to cover panel 118 and to spacer panel 122 to selectively seal first flow path 128 and coupling 212 second baffle element 126 to body panel 114 and to spacer panel 122 to selectively seal second flow path 130. Coupling 212 second baffle element 126 includes coupling second baffle element 126 such that second baffle element 126 circumscribes first baffle element 124.

Figure 10:
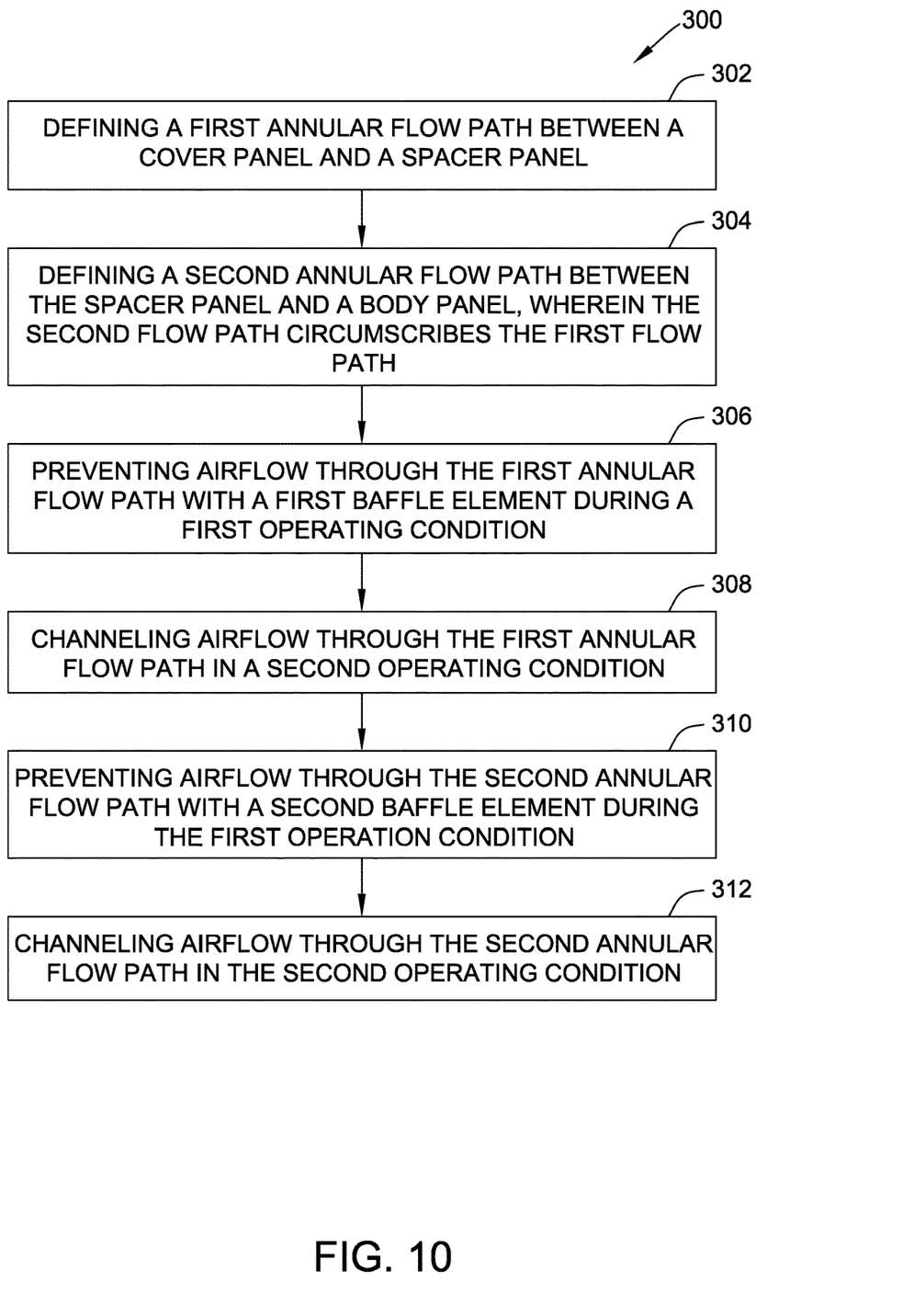
FIG. 10 is a flow chart of a method of providing a decompression flow path in an aircraft.

FIG. 10 is a flow chart of a method 300 of providing a decompression flow path in aircraft 10. Method 300 includes defining 302 first annular flow path 128 between cover panel 118 and spacer panel 122 and defining 304 second annular flow path 130 between spacer panel 122 and body panel 114, wherein second flow path 130 is concentric with and circumscribes first flow path 128. Method 300 also includes preventing 306 airflow through first flow path 128 with first baffle element 124 during a first operating condition and channeling 308 airflow through first annular flow path 128 in a second operating condition. In the exemplary implementation, channeling 308 airflow through first flow path 128 includes removing first baffle element 124 from first flow path 128, wherein removing first baffle element 124 includes fragmenting first baffle element 124 along fracture zones 144, which care pre-formed in baffle elements 124 and 126, during the second operating condition. Method 300 also includes preventing 310 airflow through second flow path 130 with second baffle element 126 during the first operating condition and channeling 312 airflow through second flow path 130 in the second operating condition. Similarly, channeling 312 airflow through second flow path 130 includes removing second baffle element 126 from second flow path 130.

The embodiments illustrated herein describe a decompression panel assembly having a cover panel positioned in an opening in a body panel to define a gap around the cover panel. An spacer panel, which is annular in shape, is positioned outboard from the cover panel and the body panel to define a first flow path between the cover panel and the spacer panel and a second flow path between the body panel and the spacer panel, wherein the first and second flow paths are also annular in shape. As described herein, the body, cover, and spacer panels are designed to closely match each other in texture and color and to match the rest of the cabin interior to improve the visual characteristics of the aircraft sidewall assembly.

The decompression panel assembly also includes a first louver member coupled within the first flow path and a second louver member coupled within the second flow path. The louver members are positioned behind the cover panel and body panel, respectively, and out of view from within the aircraft cabin. Positioning the louver members in such a configuration reduces accessibility to passengers and thus minimizes the potential for passenger abuse. Additionally, the louver members are hidden from view to prevent passengers from seeing any potential unsightly buildup of dust on the louver members The decompression panel assembly also includes a first baffle element is coupled to the cover panel and spacer panel to selectively seal the first flow path, and a second baffle element is coupled to the body panel and the spacer panel to selectively seal the second flow path. The baffle elements are continuously attached to their respective panels about their entire circumference to form an air-tight seal. During standard operations, the seals prevent airflow along either of the flow paths to reduce or prevent noise generated by vibrations cause by airflow leakage in some known assemblies. Additionally, the baffle elements use an adhesive to bond to the panels rather than a releasable mechanical fastener, which reduces the weight and costs of the decompression panel assembly.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A decompression panel assembly for use in an aircraft, said decompression panel assembly comprising:
   a body panel comprising an opening defined therein;
   a cover panel positioned within said opening and spaced from said body panel; and
   an annular spacer panel positioned outboard from said cover panel and said body panel, wherein said annular spacer panel is spaced from said cover panel to define a first annular flow path between said cover panel and said annular spacer panel, and wherein said annular spacer panel is spaced from said body panel to define a second annular flow path between said body panel and said annular spacer panel.

2. The decompression panel assembly in accordance with claim 1, wherein an annular gap is defined between said cover panel and said body panel, and wherein said annular spacer panel spans said annular gap.

3. The decompression panel assembly in accordance with claim 1, further comprising a first louver member coupled between said cover panel and said annular spacer panel and positioned within said first annular flow path.

4. The decompression panel assembly in accordance with claim 3, wherein said first louver member is annular in shape.

5. The decompression panel assembly in accordance with claim 4, further comprising a second louver member coupled between said body panel and said annular spacer panel and positioned within said second annular flow path.

6. The decompression panel assembly in accordance with claim 5, wherein said first louver member and said second louver member are annular in shape and said second louver member circumscribes said first louver member.

7. The decompression panel assembly in accordance with claim 1, further comprising a first baffle element coupled to said cover panel and said annular spacer panel and configured to selectively seal said first annular flow path.

8. The decompression panel assembly in accordance with claim 7, further comprising a second baffle element coupled to said body panel and said annular spacer panel and configured to selectively seal said second annular flow path.

9. The decompression panel assembly in accordance with claim 8, wherein said first baffle element and said second baffle element are annular.

10. The decompression panel assembly in accordance with claim 9, wherein said second baffle element circumscribes said first baffle element.

11. The decompression panel assembly in accordance with claim 8, wherein said first baffle element and said second baffle element are coupled using an adhesive.

12. The decompression panel assembly in accordance with claim 8, wherein said first baffle element and said second baffle element each comprise a plurality of designated fracture zones configured to tear during a decompression event to enable airflow through said first annular flow path and said second annular flow path.

13. The decompression panel assembly in accordance with claim 1, wherein said cover panel comprises a curved top portion that contacts said annular spacer panel.

14. A decompression panel assembly in an aircraft, said decompression panel assembly comprising:
   a first annular baffle element coupled to a first panel and a second panel, wherein said first annular baffle element forms a seal between said first panel and said second panel; and
   second annular baffle element coupled to said second panel and a third panel, wherein said second annular baffle element forms a seal between said second panel and said third panel.

15. The decompression panel assembly in accordance with claim 14, wherein said first annular baffle element and said second annular baffle element are annular.

16. The decompression panel assembly in accordance with claim 15, wherein said second annular baffle element circumscribes said first annular baffle element.

17. The decompression panel assembly in accordance with claim 14, wherein said first annular baffle element and said second annular baffle element are coupled using an adhesive.

18. The decompression panel assembly in accordance with claim 14, wherein said first annular baffle element comprises a plurality of designated fracture zones configured to tear during a decompression event to enable airflow through a first flow path defined between said first panel and said second panel.

19. The decompression panel assembly in accordance with claim 14, wherein said second annular baffle element comprises a plurality of designated fracture zones configured to tear during a decompression event to enable airflow through a second flow path defined between said third panel and said second panel.

20. The decompression panel assembly in accordance with claim 14, further comprising a first annular louver member coupled between said first panel and said second panel to define a first flow path therebetween, wherein said first annular baffle seals the first flow path.

21. The decompression panel assembly in accordance with claim 20, further comprising a second annular louver member coupled between said second panel and said third panel to define a second flow path therebetween, wherein said second annular baffle seals the second flow path.

22. The decompression panel assembly in accordance with claim 21, wherein said second annular louver member circumscribes said first annular louver member.

23. A method of assembling a decompression panel assembly for use in an aircraft, said method comprising:
   positioning a cover panel within an opening defined in a body panel such that an annular gap is defined between the body panel and the cover panel; and
   positioning an annular spacer panel outboard from the cover panel and the body panel such that the spacer panel spans the annular gap and is spaced from the cover panel to define a first flow path between the cover panel and the spacer panel and to define a second flow path between the body panel and the spacer panel.

24. The method in accordance with claim 23, further comprising coupling a first annular louver member between the cover panel and the spacer panel within the first flow path.

25. The method in accordance with claim 24, further comprising coupling a second annular louver member between the body panel and the spacer panel within the second flow path.

26. The method in accordance with claim 25, wherein coupling the second annular louver member comprises coupling the second louver member such that the second annular louver member circumscribes the first annular louver member.

27. The method in accordance with claim 23, further comprising coupling a first baffle element to the cover panel and to the spacer panel to selectively seal the first flow path.

28. The method in accordance with claim 27, further comprising coupling a second baffle element to the body panel and to the spacer panel to selectively seal the second flow path.

29. The method in accordance with claim 28, wherein coupling the second baffle element comprises coupling the second baffle element such that the second baffle element circumscribes the first baffle element.

30. A method of providing a decompression flow path in an aircraft, said method comprising:
  defining a first annular flow path between a cover panel and a spacer panel;
  defining a second annular flow path between the spacer panel and a body panel, wherein the second annular flow path circumscribes the first annular flow path;
  preventing airflow through the first annular flow path with a first baffle element during a first operating condition; and
  channeling airflow through the first annular flow path in a second operating condition.

31. The method in accordance with claim 30, further comprising preventing airflow through the second annular flow path with a second baffle element during the first operating condition.

32. The method in accordance with claim 31, further comprising channeling airflow through the second annular flow path in the second operating condition.

33. The method in accordance with claim 30, wherein channeling airflow through the first annular flow path comprises removing the first baffle element from the first annular flow path.

34. The method in accordance with claim 33, wherein removing the first baffle element from the first annular flow path comprises fragmenting the first baffle element along pre-formed fracture zones during the second operating condition.

35. The method in accordance with claim 30, wherein the first operating condition is standard operation, and wherein the second operating condition is during a decompression event.

\* \* \* \* \*